US012577848B2

(12) United States Patent   (10) Patent No.: US 12,577,848 B2
Glaesman et al.   (45) Date of Patent: Mar. 17, 2026

(54) PRESSURE COLLAPSIBLE CLOSED CELLULAR SWELL PACKER

(71) Applicant: Halliburton Energy Services, Inc., Houston, TX (US)

(72) Inventors: Chad W. Glaesman, Singapore (SG); Sandeep Thatathil, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/724,745

(22) Filed: Apr. 20, 2022

(65) Prior Publication Data
US 2023/0340855 A1     Oct. 26, 2023

(51) Int. Cl.
| | |
|---|---|
| *E21B 33/12* | (2006.01) |
| *B29C 44/02* | (2006.01) |
| *B29C 44/34* | (2006.01) |
| *B29C 44/50* | (2006.01) |
| *B29C 63/06* | (2006.01) |
| *E21B 23/06* | (2006.01) |
| *B29K 105/04* | (2006.01) |
| *B29L 31/26* | (2006.01) |

(52) U.S. Cl.
CPC .......... *E21B 33/1208* (2013.01); *B29C 44/02* (2013.01); *B29C 44/3415* (2013.01); *B29C 44/505* (2016.11); *B29C 63/06* (2013.01); *E21B 23/06* (2013.01); *B29K 2105/046* (2013.01); *B29L 2031/265* (2013.01)

(58) Field of Classification Search
CPC .................................................. E21B 33/1208
See application file for complete search history.

(56) References Cited

U.S. PATENT DOCUMENTS

| | | | |
|---|---|---|---|
| 7,392,852 B2 | 7/2008 | Richard | |
| 7,552,767 B2 * | 6/2009 | Wood ................... | E21B 33/1208 |
| | | | 166/387 |
| 8,833,443 B2 | 9/2014 | Sevre | |
| 10,487,612 B2 | 11/2019 | Muthusamy et al. | |
| 2009/0126947 A1 * | 5/2009 | King ................... | E21B 33/1208 |
| | | | 428/156 |
| 2009/0205818 A1 * | 8/2009 | Klunge ................... | C08L 51/04 |
| | | | 507/221 |

(Continued)

FOREIGN PATENT DOCUMENTS

| | | |
|---|---|---|
| CN | 109366839 | 12/2020 |

OTHER PUBLICATIONS

International Search Report and Written Opinion for International Application No. PCT/US2022/025782 dated Jan. 16, 2023.

(Continued)

*Primary Examiner* — Theodore N Yao
(74) *Attorney, Agent, or Firm* — Scott Richardson; C. Tumey Law Group PLLC

(57) ABSTRACT

Swell packer assemblies for providing a physical barrier inside a wellbore, and methods of using such swell packer assemblies, are provided. In one embodiment, the swell packer includes a substantially tubular member; and a seal element disposed on the substantially tubular member, the seal element including an elastomeric swellable material that comprises: a closed cell material having a plurality of pore spaces therein; and a compressible gas located within at least a portion of the plurality of pore spaces.

10 Claims, 4 Drawing Sheets

(56)　　　　　References Cited

U.S. PATENT DOCUMENTS

| | | | | | |
|---|---|---|---|---|---|
| 2009/0272545 | A1* | 11/2009 | Bour | ........................ | E21B 41/00 166/243 |
| 2011/0120733 | A1* | 5/2011 | Vaidya | ................ | E21B 33/1208 166/387 |
| 2012/0312560 | A1* | 12/2012 | Bahr | ................... | E21B 33/1208 166/387 |
| 2017/0198199 | A1* | 7/2017 | Parton | ..................... | E21B 43/04 |
| 2017/0356269 | A1* | 12/2017 | Denton | .............. | E21B 33/1208 |
| 2022/0010648 | A1* | 1/2022 | Musso | ................... | E21B 33/12 |

OTHER PUBLICATIONS https://www.bakerhughes.com/completions/well-monitoring-and-analytics/intelligent-completion-systems-and-flow-assurance/feedthrough-packers/repacker-reactive-element-packer accessed Feb. 9, 2023.

* cited by examiner

PRESSURE COLLAPSIBLE CLOSED CELLULAR SWELL PACKER

BACKGROUND

The present disclosure generally relates to certain swellable packers and their use in subterranean wellbore operations and related industries.

Swellable packers can be used to create a physical barrier isolating different zones of an open wellbore from one another in the drilling process. The packer assembly may be placed downhole within the wellbore in a location where isolation is needed. The packer may then be exposed to a fluid (e.g., water or hydrocarbons) to trigger the swelling of the packer's seal element. The swelling or expansion of the packer is designed to create a barrier between the downhole string and the inner casing or exposed wall of the wellbore. These barriers are often able to withstand high temperatures and pressures, which may allow for complete isolation of different zones of the well.

Conventional swellable packers are often made from dense elastomeric materials that swell when exposed to a fluid (e.g., water or hydrocarbons). However, the swellability of elastomeric materials in many conventional swellable packers is dependent on the properties of the base polymer and amount of cure, with the cure levels having an inverse relationship to the material's strength. Increasing swellability therefore often requires reducing the amount of cure of the elastomeric material, which can weaken the material itself.

BRIEF DESCRIPTION OF THE DRAWINGS

These drawings illustrate certain aspects of some of the embodiments of the present disclosure and should not be used to limit or define the disclosure.

Figure 1:
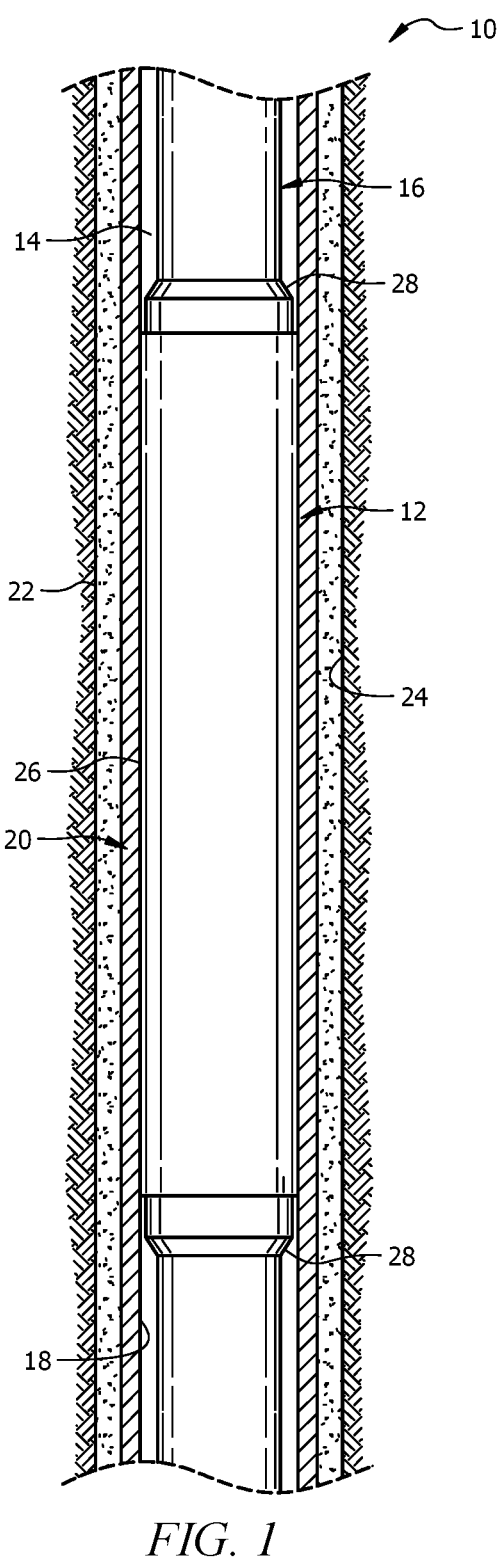
FIG. 1 is a partial cross-sectional view of a well system embodying certain aspects of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time consuming but would nevertheless be a routine undertaking for those of ordinary skill in the art having the benefit of the present disclosure.

The present disclosure relates generally to subterranean wellbore operations. Specifically, the systems and methods of the present disclosure generally involve a swellable packer assembly for providing a physical barrier inside a wellbore. The swellable packers of the present disclosure include a seal element that includes an elastomeric material having a closed cell structure having a plurality of pore spaces therein, and a compressible gas located within at least a portion of the plurality of pore spaces.

Among the many potential advantages to the methods and systems of the present disclosure, the methods and systems of the present disclosure may increase the swellability of the seal element, increase the rate of the swelling of the seal element, and allow for a more homogeneous swelling of seal element rather than a concentration of swelling in the outer diameter region. Additionally, the methods and systems disclosed herein may provide additional flexibility in ways to alter the swellability of the seal element, e.g., providing a mechanism for doing so other than decreasing cure of the swellable material. The methods and systems disclosed herein may also be collapsed with hydrostatic or applied pressure to smaller diameters to clear restrictions in their unswollen condition.

While the elastomeric material of the present disclosure may be used as described in the embodiments above, the elastomeric material of the present disclosure may be used in any type of packer assembly of any suitable design. For example, the elastomeric materials may be incorporated into packer assemblies having a pre-molded sealing element. In other embodiments, the elastomeric materials may be incorporated into "slip-on" or bonded packer assemblies that may be installed on one or more strings in a wellbore. These embodiments are intended as examples only, as the elastomeric materials may be modified and incorporated into any type of packer, including but not limited to tension packers, compression packers, and hydraulic-set single and dual string packers.

FIG. 1 shows an example well system 10 which embodies certain aspects of the present disclosure. In the system 10, a packer assembly 12 is used to provide a fluid and pressure barrier in an annulus 14 formed between a tubular 16 and a wellbore interior surface 18. Although the surface 18 is depicted in FIG. 1 as being formed on an interior of a casing, liner or other type of tubular string 20 which is encased in cement 22, the surface 18 could instead be formed on an interior wall of a formation 24 (for example, in an uncased portion of the well), or could be any other surface in the well. The packer assembly 12 includes a seal element 26 which is outwardly extended in order to contact the surface 18 and form a barrier or seal at least a portion thereof. In some embodiments such as the one shown, the seal element 26 is disposed on the tubular 16.

In the illustrated example, the seal element 26 includes an elastomeric material including a closed cell material having pore spaces and a compressible gas located within the pore spaces. In this embodiment, the elastomeric material swells in response to contact with a specified fluid, which could be, for example, water, oil, or a combination thereof. Further, in some embodiments such as the one shown, the seal element 26 optionally may be restricted from displacing longitudinally in the annulus 14 by means of end rings 28 positioned at opposite ends of the seal element 26.

Moreover, although the seal element 26 is depicted in FIG. 1 as being only a single element, multiple seal elements could be used on the tubular 16, among other reasons, to enhance the sealing capability of the packer assembly 12.

The elastomeric material of the present disclosure includes one or more polymers that are swellable in the presence of a fluid such as water. In some embodiments, the polymers may be swellable in a fluid at a temperature below about 200° C. and at a pressure below about 1,000 bar. In some embodiments, the elastomeric materials can be swellable in fluids at temperatures below 200° C., below 150° C., below 100° C., or below 50° C. and at a pressure below 1,000 bar, 700 bar, below 500 bar, or below 100 bar. These temperatures and pressures are not intended to limit this disclosure as any range or combination of temperature and pressure may be appropriate to the extent that the polymer is still swellable as described above.

The elastomeric material may include any polymer(s) that are swellable in the presence of a fluid. In certain embodiments, the polymer may be: nitrile butadiene (NBR), styrene butadiene (SBR), butadiene (BR), silicone (HCR), fluorinated ethylene propylene monomer (FEPM), ethylene propylene and/or diene (EP or EPDM), polychloroprene (CR), polyurethane (PU), epoxy thermosets, butyl (IIR), halobutyl (CIIR, BIIR), chlorinated polyethylene (CPE), acrylic (EAC), or epicholorohydrin (ECO), or any derivatives or combinations thereof. In certain embodiments, the elastomeric material can be derived from a perfluoro vinyl monomer. Additionally, the elastomeric material can be derived from at least one mono-vinyl monomer and at least one di-vinyl monomer. The mono-vinyl monomer can be selected from the group consisting of: ethylene, propylene, diene, styrene, acrylonitrile, ethylidene norbornene, vinyl ether, chloroprene, polyethylene, epicholorohydrin, ethylene oxide, AGE, methylacrylate, and any derivatives or combinations thereof. The di-vinyl monomer can be selected from the group consisting of: alkane diol diacrylates, alkane diol dimethacrylates, alkene glycol diacrylates, alkene glycol dimethacrylates, alkane diol divinyl ethers, alkene glycol divinylethers, divinylbenzene, allyl methacrylate, allyl acrylate, and any derivatives or combinations thereof. In some embodiments, the swellable polymer can be a fluorinated acrylate polymer produced from 1H, 1H, 2H, 2H-Perflurooctylacrylate and ethylenedimethacrylate monomers. Other types of vinyl monomers may be used to the extent that the resulting polymer is still swellable, as defined above.

Figure 2A:
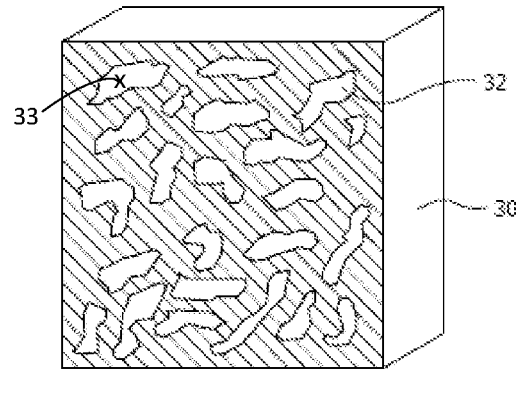
FIGS. 2a-2c are cross-sectional views of a closed cell material under varying pressures embodying certain aspects of the present disclosure.

Referring to FIG. 2*a*, the elastomeric material 30 of the present disclosure includes a closed cell material having pore spaces 32. In some embodiments, these pore spaces 32 are not in fluidic communication with adjacent pore spaces within the closed cell material. In the closed cell material, the pore spaces 32 contain a compressible gas and the pore spaces 32 will collapse under pressure. In some embodiments, the elastomeric material 30 includes only the pore spaces 32 and the compressible gas therein. The compressible gas may be any type of compressible gas, including but not limited to, nitrogen, air, oxygen, carbon dioxide, or other volatile organic gases. The elastomeric material 30 of the present disclosure is not limited to any particular percentage of pore spaces, or porosity, throughout the material. In certain embodiments, porosity may vary throughout the material.

Figure 2B:
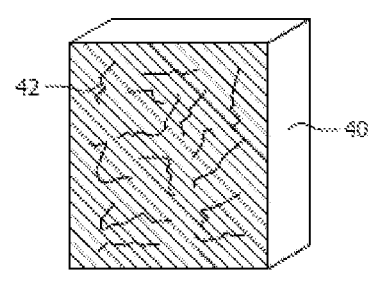
Figure 2C:
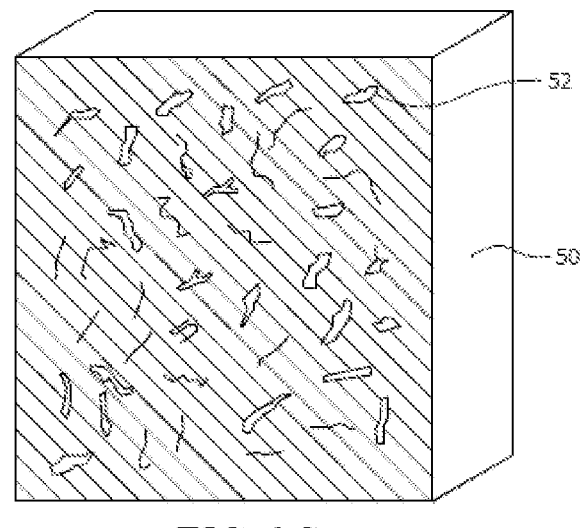

In certain embodiments of the present disclosure, elastomeric material 30 that is not swollen and under ambient pressure contains pore spaces 32 that are not collapsed, as shown in FIG. 2*a*. When elastomeric material 40 is placed under hydrostatic pressure and still not swollen, elastomeric material 40 compresses, as shown in FIG. 2*b*. In this compressed state, pore spaces 42 are collapsed. In certain embodiments, the pressure applied to accomplish the compressed state may be achieved by running the elastomeric material under pump pressure at the surface of a wellbore. Elastomeric material 50 remains in its collapsed state until it swells in the presence of a fluid, as shown in FIG. 2*c*. Once elastomeric material 50 encounters the fluid (e.g., oil or water), it may absorb at least a portion of the fluid by diffusion, replacing the compressible gas in pore spaces 52 with an incompressible fluid and thus reduce or prevent the collapse of the elastomeric material 50, even where elastomeric material 50 remains under pressure.

Figure 3A:
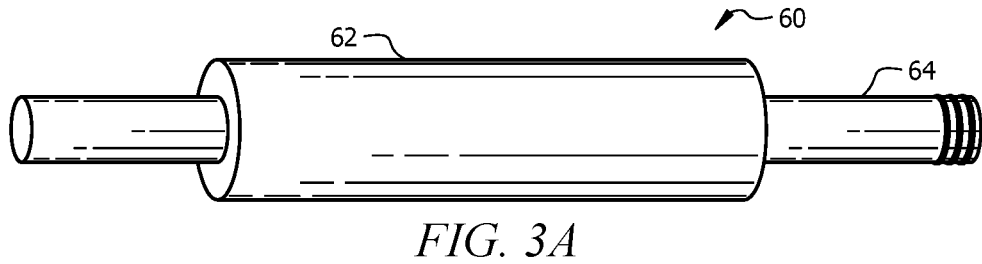
FIGS. 3a-3c are schematic representations of a swellable packer under varying pressures embodying certain aspects of the present disclosure.
Figure 3B:
Figure 3C:
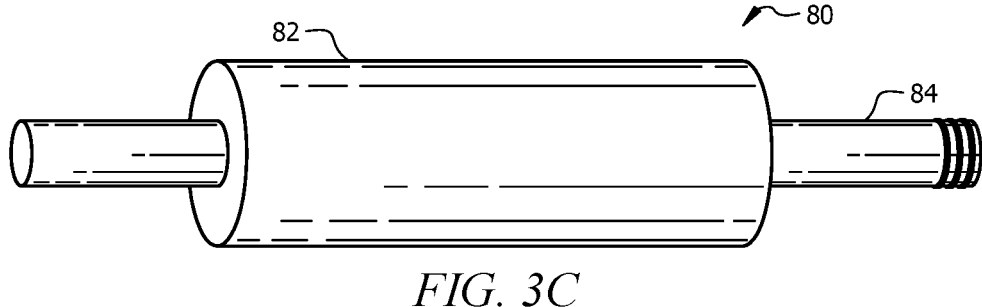

Referring additionally now to FIG. 3*a*, a swell packer assembly 60 is representatively illustrated. The swell packer assembly 60 contains a seal element 62 disposed around tubular 64 of swell packer assembly 60. Seal element 62 comprises elastomeric material 30. FIGS. 3*a*-3*c* depict how the seal element and elastomeric material react to pressure and the presence of fluids, similar to FIGS. 2*a*-2*c*. In certain embodiments of the present disclosure, elastomeric material 30 is not swollen and under ambient pressure, as shown in FIG. 3*a*. When elastomeric material 30 is placed under running pressure and still not swollen, it compresses, as shown in FIG. 3*b*. Seal element 72 thereby compresses or shrinks. When seal element 82 contacts a fluid (e.g., oil or water), it will absorb the fluid by diffusion, thereby expanding radially, as shown in FIG. 3*c*. As depicted in FIG. 3*a*, the seal element 62 has a different shape as compared to seal element 26 in FIG. 1. It should be understood that the seal element may take any shape or form when it is incorporated into a packer assembly. In certain embodiments, the elastomeric material comprising the seal element may be wrapped around the entire tubular. In other embodiments, the elastomeric material comprising the seal element may be placed on certain locations around the outer diameter of the packer assembly.

When the elastomeric material swells in the presence of a fluid (e.g., water, oil), it is meant herein that the material increases its volume upon exposure to a fluid, in some cases such that the resulting volume is greater than would be expected by mere linear addition of the polymer volume and the volume of fluid. In certain embodiments, the swelling can result in at least a 50% increase in the polymer volume. Swelling can result in, for example, at least a 50% increase in the polymer volume, at least a 150% increase in the polymer volume, at least a 250% increase in the polymer volume, or at least a 350% increase in the polymer volume. Due to the closed cell nature of the elastomeric material in certain embodiments of the present disclosure, additional swelling occurs due to the fluid being absorbed within the pore spaces when it replaces the compressible gas. That is, the fluid may penetrate further into the elastomeric material by going into the pore spaces, rather than just swelling through absorption at the outer surface of the elastomeric material. The elastomeric material of the present disclosure therefore can, in some embodiments, swell more than conventional elastomeric materials.

In addition to a larger extent of total swelling, the elastomeric material of the present disclosure may allow for rapid swelling and more consistent swelling of the material across the cross section. Due to the closed cell nature of the elastomeric material and the pore spaces within, the elastomeric material has a volume built in to contain additional fluids that is not limited by diffusion. The pore spaces allow the fluid to enter the elastomeric material more rapidly and results in faster setting times. And the location of the pore spaces throughout the elastomeric material allow the fluid to be absorbed more evenly throughout the elastomeric material rather than being concentrated in the outer diameter region, where the fluid first contacts the elastomeric material.

A method of operating the packer assembly is also provided. The method may include the steps of: providing a packer comprising a substantially tubular member and a seal element disposed around the substantially tubular member, the seal element comprising an elastomeric material that includes a closed cell material having pore spaces therein and a compressible gas located within the pore spaces. In certain embodiments, the method may further include placing the packer in at least a portion of a wellbore penetrating at least a portion of a subterranean formation. In certain embodiments, the method may further include allowing at least a portion of the elastomeric material to contact a fluid, whereby the elastomeric material swells. The methods may further include performing a portion of one or more well treatment operations (e.g., a fracturing treatment) in a zone or portion of the wellbore that has been isolated from the rest of the wellbore using the packer of the present disclosure.

The elastomeric materials of the present disclosure additionally may be used outside of packer assemblies. In certain embodiments, the elastomeric materials can be installed in a gravel-pack screen to block off the screen once a particular fluid flows through the screen. As in the packer context, the elastomeric materials could swell in the presence of a specific fluid (e.g., water), thereby sealing off the flow of other fluids through the screen.

A method of making the elastomeric material of the present disclosure is also provided. The method may include the steps of: mixing an elastomeric material with a blowing agent, vulcanization agent, reinforcing fillers, and other additives; and pressing the compounded mixture into a compression, transfer, or injection mold where vulcanization occurs. In some embodiments, vulcanization occurs by extruding a strip, wrapping it onto a base pipe, covering the extruded rubber with a nylon fabric compression tape, and vulcanizing in a steam autoclave, wherein a closed cell material is formed comprising a cured elastomeric material with pore spaces containing a compressible gas. In other embodiments, vulcanization occurs when a profile is extruded and heated through a heated salt bath or electron beam chamber. In certain embodiments, the mixture could be heated before being pressed into compression, transfer, or injection molding processes. In other embodiments, the mixture may be pressed into a compression mold and then heated. It should be understood that any manner of vulcanization processes may be used in the method to make the elastomeric material of the present disclosure in keeping with the present disclosure.

The pore spaces within the elastomeric material of the present disclosure may be formed by any suitable means or combination thereof. In certain embodiments, the method may further include adding a blowing agent to the mixture wherein said blowing agent forms the compressible gas during vulcanization. During vulcanization, the blowing agent may be consumed because it decomposes at the cure temperature of the elastomeric material to release the gas.

The release of the compressible gas from the reaction with the blowing agent can form the pore spaces within the elastomeric material.

The blowing agent may be any compound that reacts to release a compressible gas at or below the cure temperature of the elastomeric material. In certain embodiments, the blowing agent used in the embodiments of the present disclosure may be p, p'-oxybis-benzene sulfonyl hydrazine (OBSH), azodicarbonamide (ADC), or dinitroso pentamethylene tetramine (DNPT), P-Toluenesulphonyl Hydrazide (TSH), Azodicarbonamide (AZO), or any derivatives or combinations thereof. Physical blowing agents that use phase changes to gas include volatile organic hydrocarbons (like pentane and other aliphatic light hydrocarbons) and liquid carbon dioxide.

Figure 4:
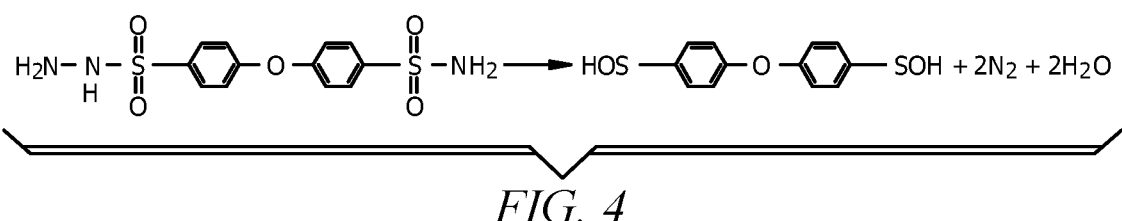
FIG. 4 is a schematic representation of an example of blowing agent decomposition embodying certain aspects of the present disclosure.

FIG. 4 illustrates the formula for an example of a decomposition reaction of a blowing agent. In this example, OBSH undergoes a chemical reaction whereby nitrogen gas is released during the reaction. This nitrogen gas is the compressible gas that creates the closed cell structure within the elastomeric material.

In certain embodiments, the pore spaces within the elastomeric material of the present disclosure may be formed by mixing the elastomeric material with low-crush strength microspheres. In certain embodiments, the microspheres may be glass, ceramic, or metallic. The microspheres may also contain a compressible gas within. When the microspheres are added to the mixture with the elastomeric material, the microspheres are retained within the elastomeric material when the material is cured. Pressure may then be applied to the cured material to at least partially crush the microspheres. Once the microspheres have been crushed, pore spaces may remain in the elastomeric material with a compressible gas within.

Example

Figure 5:
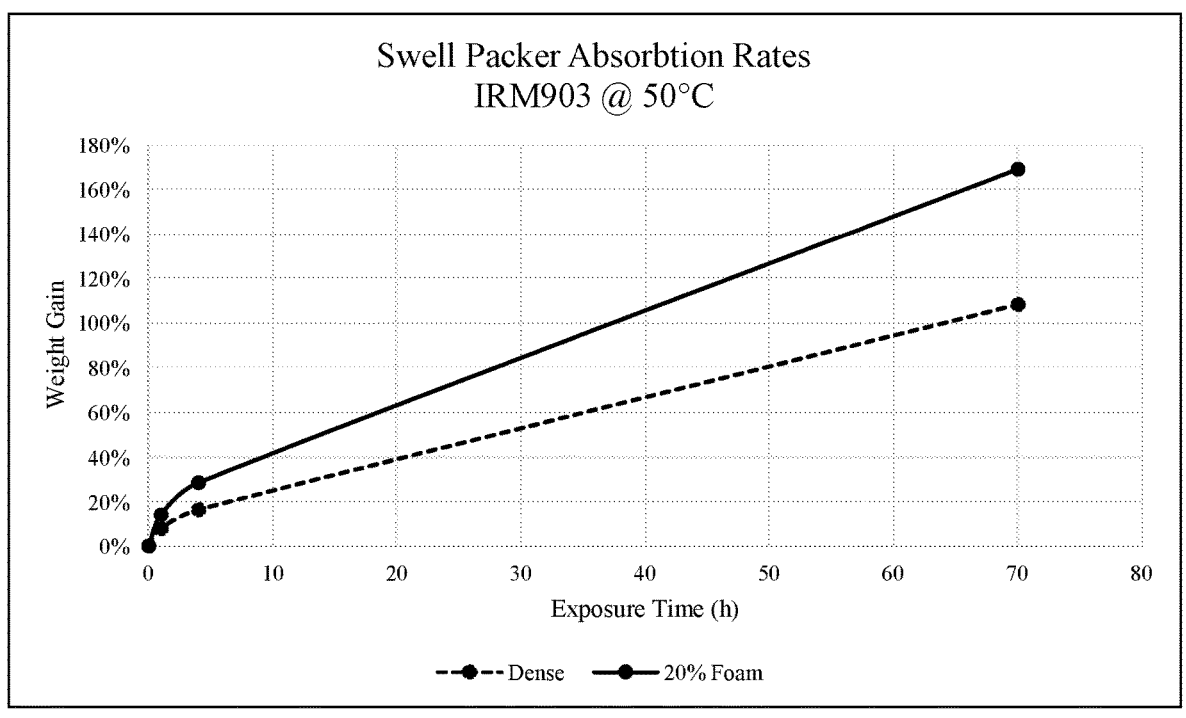
FIG. 5 is a graph displaying weight changes of a closed cell material embodying certain aspects of the present disclosure compared to conventional material.
Figure 6:
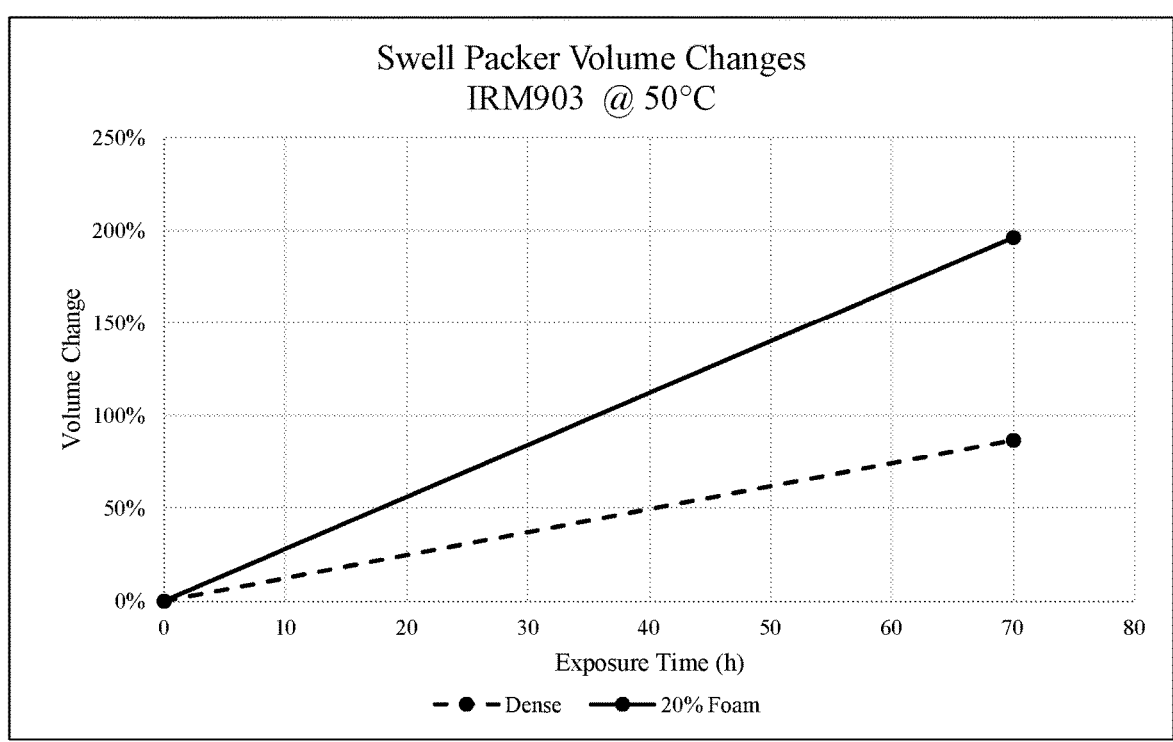
FIG. 6 is a graph displaying volume changes of a closed cell material embodying certain aspects of the present disclosure compared to conventional material.

The following example further illustrates certain aspects of the present disclosure. To test the absorption of the elastomeric materials, samples of (1) a conventional dense elastomeric material used in swell packers (comprised of ethylene propylene diene monomer (EPDM) rubber), and (2) an elastomeric material of the present disclosure (comprised of EPDM rubber with OBSH blowing agent to create a foam with a density 20% lower than the original EPDM rubber material) were cut measuring 1 in. by 1 in. with a 2 mm thickness. Each sample was immersed in IRM903 oil (a commercially available reference oil) for 72 hours. The tests were conducted at 50° C. The weight of the EPDM rubber and the 20% foam samples in air were calculated before sample immersion and after 72 hours, and the results of are plotted in FIG. 5. Volume swell, using the weights of the samples in air and water, was then measured based on these data. As FIG. 6 depicts, the 20% foam material of the present disclosure exhibited greater absorption than a conventional dense elastomeric material (EPDM rubber).

An embodiment of the present disclosure is a packer that includes: a substantially tubular member; and a seal element disposed on the substantially tubular member, the seal element comprising an elastomeric swellable material that includes: a closed cell material having a plurality of pore spaces therein; and a compressible gas located within at least a portion of the plurality of pore spaces.

In one or more embodiments described in the preceding paragraph, the compressible gas is formed by a chemical reaction involving a blowing agent. In one or more embodiments described above, the compressible gas is nitrogen. In one or more embodiments described above, the compressible gas is carbon dioxide. In one or more embodiments described above, the elastomeric swellable material comprises at least one swellable polymer selected from the group consisting of: nitrile butadiene (NBR), styrene butadiene (SBR), butadiene (BR), silicone (HCR), fluorinated ethylene propylene monomer (FEPM), ethylene propylene (EP), ethylene diene (EPDM), polychloroprene (CR), polyurethane (PU), an epoxy thermoset, butyl (IIR), halobutyl (CIIR, BIIR), chlorinated polyethylene (CPE), acrylic (EAC), epicholorohydrin (ECO), any derivative thereof, and any combination thereof. In one or more embodiments described above, the packer further includes one or more end rings disposed at opposite ends of the seal element.

Another embodiment of the present disclosure is a method that includes: providing a packer that includes: a substantially tubular member; and a seal element disposed on the substantially tubular member, the seal element comprising a swellable elastomeric material that includes: a closed cell material having a plurality of pore spaces therein; and a compressible gas located within at least a portion of the plurality of pore spaces; and placing the packer in at least a portion of a wellbore penetrating at least a portion of a subterranean formation.

In one or more embodiments described in the preceding paragraph, the method further includes allowing at least a portion of the swellable elastomeric material to contact a fluid, whereby the elastomeric material at least partially swells. In one or more embodiments described above, the swollen elastomeric material has a volume that is at least 50% greater than a volume of the elastomeric material before the step of allowing it to contact the fluid. In one or more embodiments described above, the method further includes allowing the swollen elastomeric material to contact at least a portion of an interior surface in the wellbore to form a seal. In one or more embodiments described above, the interior surface in the wellbore comprises an interior surface of a casing string disposed in the wellbore. In one or more embodiments described above, the method further includes performing at least a portion of a well treatment operation in a portion of the wellbore proximate to the packer. In one or more embodiments described above, the compressible gas is nitrogen. In one or more embodiments described above, the compressible gas is carbon dioxide. In one or more embodiments described above, the elastomeric swellable material comprises at least one swellable polymer selected from the group consisting of: nitrile butadiene (NBR), styrene butadiene (SBR), butadiene (BR), silicone (HCR), fluorinated ethylene propylene monomer (FEPM), ethylene propylene (EP), ethylene diene (EPDM), polychloroprene (CR), polyurethane (PU), an epoxy thermoset, butyl (IIR), halobutyl (CIIR, BIIR), chlorinated polyethylene (CPE), acrylic (EAC), epicholorohydrin (ECO), any derivative thereof, and any combination thereof.

Another embodiment of the present disclosure is a method that includes: mixing an elastomeric material with a blowing agent to form a mixture; pressing the mixture into a mold; and heating the mixture in the mold to a vulcanization temperature to at least partially cure the elastomeric material; wherein a closed cell material is formed comprising the cured elastomeric material having a plurality of pore spaces therein, wherein at least a portion of the plurality of pore spaces contain a compressible gas.

In one or more embodiments described in the preceding paragraph, the method further includes adding a blowing agent to the mixture wherein said blowing agent chemically reacts during vulcanization of the elastomeric material to form the compressible gas. In one or more embodiments described above, the method further includes adding a blowing agent to the mixture wherein said blowing agent physically reacts during vulcanization of the elastomeric material to form the compressible gas. In one or more embodiments described above, the method further includes extruding the mixture as a strip and wrapping it onto a base pipe; covering the extruded mixture with a nylon fabric compression tape; and vulcanizing the mixture in a steam autoclave. In one or more embodiments described above, the method further includes extruding the mixture; and heating the mixture through a heated salt bath or electron beam chamber.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. No limitations are intended to the details of construction or design herein shown, other than as described in the claims below. Even though the figures depict embodiments of the present disclosure in a particular orientation, it should be understood by those skilled in the art that embodiments of the present disclosure are well suited for use in a variety of orientations. Accordingly, it should be understood by those skilled in the art that the use of directional terms such as above, below, upper, lower, upward, downward and the like are used in relation to the illustrative embodiments as they are depicted in the figures, the upward direction being toward the top of the corresponding figure and the downward direction being toward the bottom of the corresponding figure. While systems and methods are described in terms of "comprising," "containing," or "including" various components or steps, the systems and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   providing a packer comprising:
      a substantially tubular member; and
      a seal element disposed on the substantially tubular member, the seal element comprising a swellable elastomeric material that comprises:
         a closed cell structure having a plurality of pore spaces therein; and
         a compressible gas located within at least a portion of the plurality of pore spaces, the compressible gas given by a blowing agent that chemically reacts in vulcanization of the elastomeric swellable material, wherein the blowing agent comprises at least one of azodicarbonamide, dinitroso pentamethylene tetramine, or p-Toluenesulphonyl hydrazide, and wherein the elastomeric swellable material comprises microspheres containing additional compressible gas;

placing the packer in at least a portion of a wellbore penetrating at least a portion of a subterranean formation to form a seal in the wellbore; and crushing the microspheres by applying pressure to the swellable elastomeric material with a fluid in the wellbore, thereby releasing the additional compressible gas in the swellable elastomeric material while maintaining the seal in the wellbore, wherein the swellable elastomeric material comprises at least one swellable polymer selected from the group consisting of: nitrile butadiene rubber (NBR), styrene butadiene rubber (SBR), butadiene rubber (BR), high consistency silicone rubber (HCR), fluorinated ethylene propylene monomer (FEPM) rubber, ethylene propylene (EP) rubber, ethylene propylene diene monomer (EPDM) rubber, polychloroprene, chloroprene rubber (CR), polyurethane (PU), an epoxy thermoset, butyl rubber, isobutylene-isoprene rubber (IIR), halobutyl rubber, chlorobutyl rubber (CIIR), bromobutyl rubber (BIIR), chlorinated polyethylene (CPE), ethyl acrylate copolymer (EAC), and epichlorohydrin rubber (ECO).

2. The method of claim 1 wherein at least a portion of the swellable elastomeric material contacts the fluid in the wellbore, whereby the swellable elastomeric material at least partially swells.

3. The method of claim 2 wherein the swellable elastomeric material as swollen by the contact with the fluid has a volume that is at least 50% greater than a volume of the swellable elastomeric material before the swellable elastomeric material contacts the fluid.

4. The method of claim 2 further comprising allowing the swollen elastomeric material to contact at least a portion of an interior surface in the wellbore to form the seal.

5. The method of claim 4 wherein the interior surface in the wellbore comprises an interior surface of a casing string disposed in the wellbore.

6. The method of claim 4 further comprising performing at least a portion of a well treatment operation in a portion of the wellbore proximate to the packer.

7. The method of claim 1 wherein the compressible gas as given by the blowing agent forms at least some of the pore spaces within the elastomeric swellable material.

8. The method of claim 1 wherein the additional compressible gas comprises nitrogen, air, oxygen, carbon dioxide, or a volatile organic gas, or any combinations thereof, and wherein the pressure comprises hydrostatic pressure of the fluid or surface pump pressure of the fluid, or both.

9. The method of claim 1 wherein the elastomeric swellable material absorbs the fluid by diffusion from the wellbore, thereby replacing the compressible gas in the at least a portion of the plurality of pore spaces with the fluid.

10. The method of claim 9 wherein replacing the compressible gas in the plurality of pore spaces with the fluid reduces or prevents collapse of the elastomeric swellable material in the wellbore.

* * * * *